No. 644,200. Patented Feb. 27, 1900.
A. J. GAIRING.
MOTOR SUSPENSION.
(Application filed Aug. 22, 1899.)
(No Model.)

WITNESSES:
S. E. Clarkson
M. E. Sharpe.

INVENTOR
A. J. Gairing
BY
Geo. H. Parmelee
his ATTORNEY.

UNITED STATES PATENT OFFICE.

ALFRED J. GAIRING, OF JOHNSTOWN, PENNSYLVANIA, ASSIGNOR TO THE LORAIN STEEL COMPANY, OF PENNSYLVANIA.

MOTOR SUSPENSION.

SPECIFICATION forming part of Letters Patent No. 644,200, dated February 27, 1900.

Application filed August 22, 1899. Serial No. 728,074. (No model.)

*To all whom it may concern:*

Be it known that I, ALFRED J. GAIRING, of Johnstown, in the county of Cambria and State of Pennsylvania, have invented a new and useful Improvement in Motor Suspensions, of which the following is a full, clear, and exact description, reference being had to the accompanying drawings, which form a part of this specification.

This invention has relation to certain new and useful improvements in motor suspensions for electric vehicles, and particularly for electric-railway cars, and is designed to provide a suspension of simple and durable construction which retains the advantages due to sleeving the motors by providing an elastic support for their nose ends, whereby they are permitted limited movement about the axles and are cushioned against jars or strains which might otherwise occur from such movement, the axles at the same time being largely relieved of the dead-weight of the motors.

The invention is also designed to provide a suspension of this character wherein the motors are supported independently of the truck-frame and of the vehicle-body.

With these objects in view my invention consists in the novel construction and combination of parts, all as hereinafter described, and pointed out in the appended claims.

Figure 1:
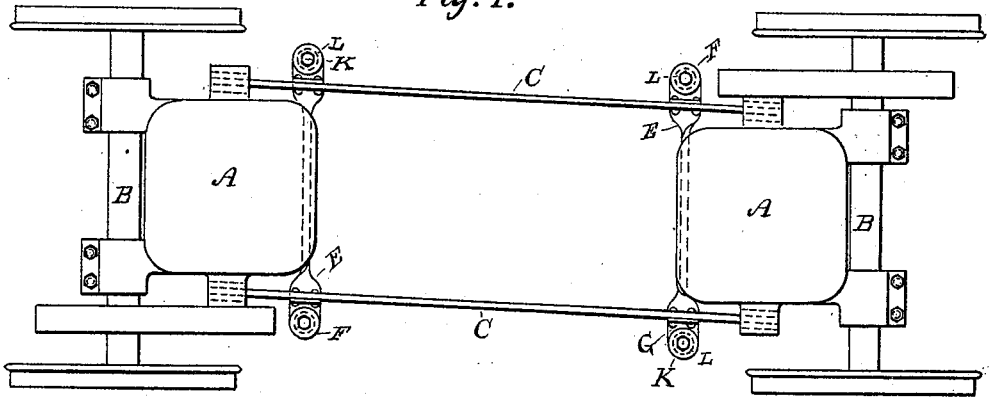
Figure 2:
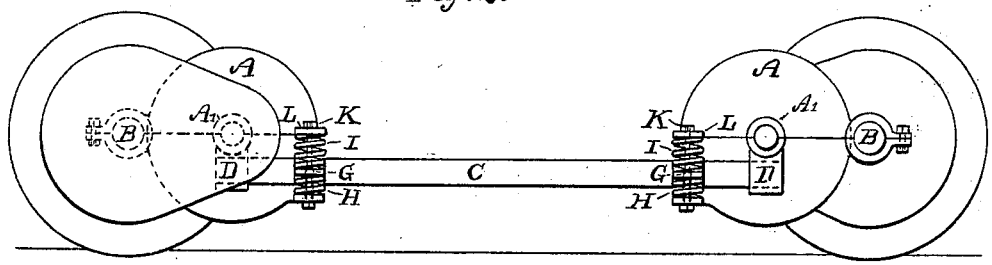

In the accompanying drawings, illustrating my invention, Figure 1 is a plan view showing the suspension as applied, and Fig. 2 is a side elevation.

In the figures the letters A A designate the two motors, which are sleeved upon the axles B in the usual manner. C C designate two rigid bars, which connect the side portions of the two motors. In the present construction these bars are shown as seated at their end portions in pockets D, extending down from the armature-shaft bearings A' of the motors. Obviously, however, the said pockets may be located at other points on the motor-casings. The engagement of the bars with the pockets should not be a perfectly-rigid one either vertically or longitudinally.

E E designate cross-bars, one of which is rigidly bolted to the nose end of each motor, with its end projecting underneath and outside of the side bars C and shaped to form spring-seats F. Bolted to the outer face of each side bar, directly over each spring-seat F, is an angle-plate G, which provides a seat at its under side for the upper end of a helical spring H, and at its upper side a seat for the lower end of a second spring I. Secured at its lower end in each spring-seat F is a rod or bolt K, which extends loosely up through an aperture in the angle-plate G and is provided at its upper end with a spring-cap L, against which the upper end of the spring I is seated.

It will be readily seen that a considerable portion of the weight of the motors, instead of coming directly upon the axle as dead-weight, is transmitted to the axle indirectly through the springs. The latter also effectively cushions the motors against movements due to torque or track inequalities in both directions.

I do not wish to limit myself to the particular construction which I have herein shown and described, as it is obvious that many modifications may be made in the various details without departing from the spirit and scope of my invention as pointed out in the appended claims.

Having thus described my invention, what I claim, and desire to protect by Letters Patent, is—

1. The combination with two motors, each of which is sleeved to a vehicle-axle, of a suspension-frame therefor consisting of a pair of bars whose end portions engage seats on the motor frames or casings at points between the said axles, and cushioned connections between the free or nose portions of the motors and the said bars.

2. The combination with two motors, each of which is sleeved to a vehicle-axle, of a suspension-frame therefor consisting of a pair of rigid bars whose end portions engage seats on the motor-frame at points in the vertical lines of their centers of gravity, and cushioned connections between the free or nose portions of the motors and the said bars.

3. The combination with two motors, each of which is sleeved to a vehicle-axle, of the side bars whose end portions loosely engage seats or pockets on the motor frames or casings at points between the said axles, and cushioned connections between the free or nose portions of the motors and the said bars.

4. The combination with two motors, each of which is sleeved to a vehicle-axle, of the side bars whose end portions loosely engage seats or pockets on the motor-frame at points below and in the line of the centers of gravity of the motors, and spring-cushions interposed between the free or nose portions of the motors and the said bars.

5. The combination with two motors, each of which is sleeved to a vehicle-axle, of the side bars whose end portions loosely engage seats or pockets depending from the motor-frames at points between the vehicle-axles, of the cross-bars connected to the nose portions of the said frames and spring-cushions interposed between the cross-bars and the side bars.

6. The combination with two motors, each of which is sleeved to a vehicle-axle, of the side bars engaging depending seats on the motor-casings, the cross-bars connected to the nose portions of the said casings, and two sets of oppositely-acting springs interposed between the said side and cross bars.

7. The combination with two motors, each of which is sleeved to a vehicle-axle, of the side bars engaging seats or pockets on the motor-casings, of cross-bars connected to the nose portions of said casings and extending underneath the said side bars, rods or bolts secured in the end portions of the said cross-bars and carrying spring-caps above the side bars, spring-seats on the side bars, a set of springs interposed between the said seats and the spring-caps, and a second set of springs interposed between the said seats and the ends of the cross-bars.

8. The combination with two motors, each of which is sleeved to a vehicle-axle, of side bars whose end portions engage pockets or seats on the motor frames or casings, spring-seats carried by said side bars, cross-bars secured to the nose ends of the motors, spring-caps carried by the said cross-bars above the said spring-seats, springs interposed between the said seats and caps and springs interposed between the said seats and the ends of the cross-bars.

9. The combination with two motors, each of which is sleeved to a vehicle-axle, of side bars whose end portions engage the motors at points adjacent to their centers of gravity, cross-bars secured to the nose or free ends of the motors, and spring-cushions forming a connection between the side bars and the cross-bars.

In testimony whereof I have affixed my signature in presence of two witnesses.

ALFRED J. GAIRING.

Witnesses:
B. M. SMITH,
H. W. SMITH.